United States Patent [19]

George et al.

[11] Patent Number: 4,524,054

[45] Date of Patent: Jun. 18, 1985

[54] PROCESS FOR THE PRODUCTION OF DICALCIUM PHOSPHATE

[75] Inventors: Christopher W. George, Brighton; Hari N. Sinha, Surrey Hills; Mary R. Vujcich, Albert Park; Graham S. Walker, Brighton, all of Australia

[73] Assignees: Commonwealth Scientific and Industrial Research Organization; Queensland Phosphate Limited, both of Australia

[21] Appl. No.: 574,097

[22] PCT Filed: May 4, 1983

[86] PCT No.: PCT/AU83/00054

§ 371 Date: Jan. 5, 1984

§ 102(e) Date: Jan. 5, 1984

[87] PCT Pub. No.: WO83/03818

PCT Pub. Date: Nov. 10, 1983

[30] Foreign Application Priority Data

May 5, 1982 [AU] Australia ............... PF3855

[51] Int. Cl.³ .................. C01B 15/16; C01B 25/26
[52] U.S. Cl. .................. 423/308; 423/167; 423/311; 423/319

[58] Field of Search .............. 423/319, 320, 321 R, 423/321 S, 167, 308, 311

[56] References Cited

U.S. PATENT DOCUMENTS 4,113,842  9/1978  McCullough et al. ............ 423/167
4,238,459 12/1980  Phillips et al. .................... 423/167

*Primary Examiner*—Gregory A. Heller
*Attorney, Agent, or Firm*—Sughrue, Mion, Zinn, Macpeak, and Seas

[57] ABSTRACT

A process for the recovery of phosphate values from a phosphate ore, wherein the ore is leached with a mixture comprising water, sulphur dioxide and an organic carbonyl compound; the leach liquor containing dissolved phosphate values and calcium hydroxysulphonate is separated from any gangue and other insoluble material; and the leach liquor is treated to recover therefrom a phosphate-rich product and at least part of the sulphur dioxide and the carbonyl compound; characterized in that the leaching is carried out under conditions such that substantially no calcium hydroxysulphonate is precipitated at the leaching stage.

10 Claims, 1 Drawing Figure

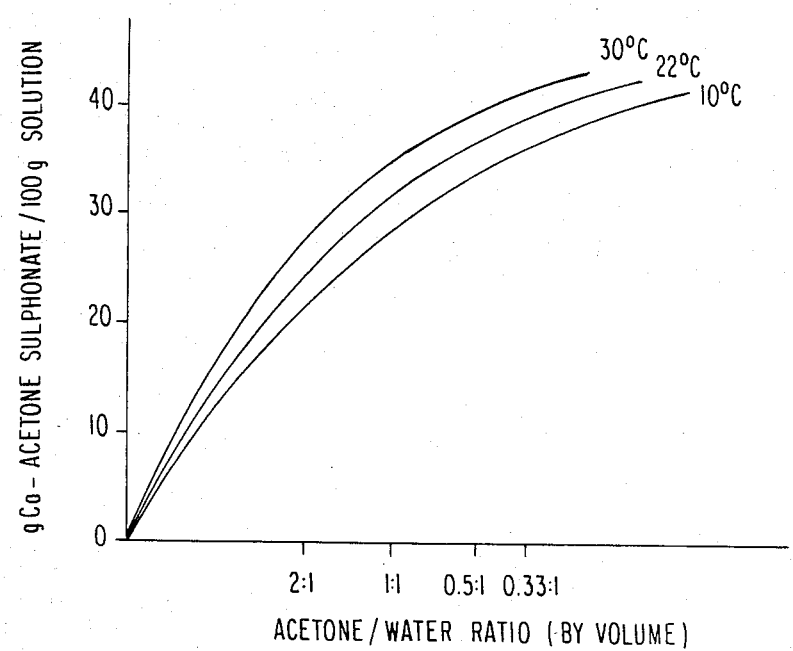
SOLUBILITY OF Ca-ACETONE SULPHONATE IN
ACETONE/WATER/$SO_2$ PHOSPHORIC ACID MIXTURES
(PHOSPHORIC ACID ADDED IN THE RATIO 3:1 $SO_2$:$P_2O_5$)

PROCESS FOR THE PRODUCTION OF DICALCIUM PHOSPHATE

This invention relates to the beneficiation of phosphate ores, and in particular to the beneficiation of low-grade phosphate ores.

As deposits of good quality phosphate rock are becoming exhausted, increasing attention is being given to the potential of the abundant deposits of lower phosphate content rock as a source of phosphate fertilizers and the like. Unfortunately it is found that in addition to yielding less phosphate, such rock often contains impurities which give rise to problems not encountered when processing higher-grade material. For example, when the sulphuric/phosphoric acid digestion process for producing superphosphate is applied to a low-grade, high silica-content rock, the inert gangue introduced by the impurities gives a superphosphate product which has a reduced phosphate content, and hence requires higher transport and distribution costs, when compared to superphosphate made from higher grade materials.

In addition, the conventional sulphuric/phosphoric acid processes required the production of sulphuric acid from sulphur dioxide which in turn is derived from brimstone, smelter off-gases or some other source of sulphur.

With a view to avoiding the aforesaid problems, we have investigated the leaching of phosphate ores with mixtures comprising water, sulphur dioxide ($SO_2$) and an organic carbonyl compound such as acetone. It is well known that admixtures of this type give rise to an hydroxysulphonic acid, according to the equation:

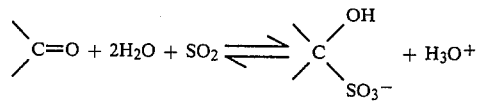

As a result of the enhanced $SO_2$ activity and hydroxonium ion concentration the leachant readily takes up the phosphate values from the ore, but silica and other impurities, such as iron, aluminium and fluorine remain virtually unaffected.

U.S. Pat. No. 4,113,842, assigned to the Tennessee Valley Authority (TVA), describes the use of hydroxysulphonic acid leachants in preparing dicalcium phosphate from phosphate ores. In the process described in this patent, dicalcium phosphate is taken into solution during leaching but calcium hydroxysulphonate, which is formed at the same time, is separated as a solid along with unreacted gangue. When the process is operated in this way, the presence of calcium hydroxysulphonate causes the leach slurry to become thixotropic. The consequences of this are that the efficiency of leaching is seriously reduced, and, when the solids are separated from the leach liquor by filtration, the retention of a large amount of mother-liquor by the solids makes it difficult to wash the filter-cake economically. Moreover, while the calcium hydroxysulphonate may be treated for recovery of the $SO_2$ and the carbonyl compound by thermal decomposition, because the sulphonate is precipitated at the leaching step, as taught in the TVA patent, the recovery step becomes energy inefficient because the inert gangue as well as the sulphonate has to be heated to the required temperature. It will be appreciated that with low-grade ores, which in some instances may yield nearly 50% inert residue, such a process could result in a significant energy wastage.

We have now found that by careful control of leaching conditions it is possible to keep the calcium hydroxysulphonate in solution during leaching and thus defer precipitation of calcium until a stage in the process which is technically and economically more advantageous.

Accordingly, in its broadest aspect this invention provides a process for the recovery of phosphate values from a phosphate ore, wherein the ore is leached with a mixture comprising water, sulphur dioxide and an organic carbonyl compound, under conditions such that substantially no calcium hydroxysulphonate is precipitated.

Suitable carbonyl compounds are ketones and aldehydes such as acetone, methyl ethyl ketone, methyl isobutyl ketone, cyclohexanone, acetaldehyde, formaldehyde and substituted and unsubstituted benzaldehydes.

Our investigations have shown that calcium hydroxysulphonates have a limited solubility in the reaction mix and their solubility is dependent upon factors such as calcium ion concentration, carbonyl concentration, phosphate ($P_2O_5$) concentration and temperature. Thus the sulphonate solubility increases with decreasing carbonyl concentration, and increases with increasing temperature at least over the range 10°–40° C. Adding $P_2O_5$ to the system lowers the solubility of the salt and preferably, for maximum solubility, the solution should be saturated with $SO_2$. It should be appreciated that the aforementioned factors are to some extent interactive. Accordingly to facilitate selection of effective conditions we provide a graph, FIG. 1, which illustrates the variation in solubility of calcium-acetone sulphonate in acetone/water/$SO_2$ mixtures at different temperatures.

In the process of this invention, the leach solution may be treated in a variety of ways to precipitate a phosphate-rich product and allow recovery of at least part of the carbonyl compound and the $SO_2$. For example, any one of the following procedures may be used.

A. Distillation at 55°–75° C. to precipitate mainly dicalcium phosphate.

B. Distillation under reduced pressure at ambient temperature to precipitate mainly hydrated dicalcium phosphate.

C. Holding under reduced pressure to remove part of the $SO_2$, followed by distillation at 55°–75° C. to precipitate mainly dicalcium phosphate.

D. Distillation, first at about 60° C. to precipitate a calcium fluoride-rich product, which can be separated, then at about 75° C. to precipitate mainly dicalcium phosphate. The latter, being very low in fluorine content may be used in animal feedstuffs without further purification.

E. Distillation, with or without prior holding under reduced pressure, in the range 80°–100° C. to produce a mixture of dicalcium phosphate and calcium sulphite. Because of its sulphur content this product has considerable value as a combined phosphorous/sulphur plant nutrient.

F. Treatment with sulphuric acid to bring about the precipitation, as gypsum, of calcium in excess of that required to meet the Ca/P ratio of dicalcium phosphate. After separation of the gypsum, the liquor may be distilled at 80°–100° C. to precipitate mainly dicalcium phosphate. The sulphuric acid may be added during or after the leaching step. If added during leaching, it allows recycle of some of the leach liquor to the leaching stage to increase its $P_2O_5$ content, because there are none of the complications associated with the precipitation of calcium as hydroxysulphonate.

Following treatment according to any one of the above procedures, A to D, the liquor remaining after separation of the precipitated dicalcium phosphate may be distilled at 90°–100° C. for further recovery of carbonyl compound and $SO_2$, and to precipitate calcium sulphite.

The following examples are illustrative of various aspects of the invention, but are not to be regarded as limiting.

All mesh sizes are Tyler.

EXAMPLE 1

A 690 g sample of Duchess phosphate ore (−10 mesh) containing 24.4% $P_2O_5$, 35.7% CaO and 33.0% $SiO_2$ was leached for 2 hours at room temperature with a mixture of 810 g acetone, 2000 g water and 590 g sulphur dioxide. After leaching, the mother-liquor was separated from the residue by filtration. The filter-cake was washed with two 300 ml portions of water. The combined mother-liquor and first cake-wash contained 91% of the input $P_2O_5$, and the second cake-wash a further 2%.

A portion of the combined mother-liquor and first cake-wash was distilled at 88° C. for 1 hour. A solid precipitated during distillation which contained 96% of the $P_2O_5$ of the starting liquor. The solid which had an analyses of 33.6% $P_2O_5$ and 7.5% S, was shown by XRD analysis to be monetite ($CaHPO_4$) admixed with calcium sulphite hemihydrate ($CaSO_3 \cdot \frac{1}{2}H_2O$).

EXAMPLE 2

A portion of Duchess ore of the same composition as in Example 1 was ground to −48 mesh. A 685 g sample was leached for 2 hours at room temperature with a mixture of 790 g acetone, 2000 g water and 585 g sulphur dioxide. Slurry samples were withdrawn at set times during leaching and analysed for $P_2O_5$ in solution. Analysis showed that after 30 minutes 94% of the input $P_2O_5$ had been extracted, rising to 98% after 2 hours. After leaching, the slurry was treated as in Example 1. The combined mother liquor and first cake-wash obtained 97% of the input $P_2O_5$.

A portion of the combined mother liquor and first cake-wash was distilled at 91° C. for 1 hour. The precipitated solid had an analysis of 32.8% $P_2O_5$, 7.8% S and contained 99% of the $P_2O_5$ in the starting liquor.

EXAMPLE 3

A 815 g sample of deslimed Duchess ore (−10 mesh) containing 22.5% $P_2O_5$, 30.0% CaO and 37.7% $SiO_2$ was leached for 3 hours at 25° C. with a mixture of 795 g acetone, 2000 g water and 585 g sulphur dioxide. Residue analysis showed that 89% of the input $P_2O_5$ was extracted.

A portion of the combined mother-liquor and first cake-wash was distilled at 60° C. for 15 minutes. A solid precipitated which had an analysis of 6.1F and 41.5% $P_2O_5$. XRD analysis showed the solid to be a mixture of calcium fluoride and monetite.

After filtering off the first precipitate the filtrate was further distilled at 75° C. for 90 minutes. A second quantity of solid precipitated which had an analysis of 0.2% F, 48.1% $P_2O_5$ and contained 78% of the $P_2O_5$ in the original combined mother-liquor and first cake-wash sample.

EXAMPLE 4

A 1040 g sample of deslimed Duchess ore of the same composition as in Example 3 was leached for 3 hours at room temperature with a mixture of 165 g sulphuric acid, 790 g acetone, 2000 g water and 585 g sulphur dioxide. On completion of leaching the mother-liquor was separated from the residue by filtration. The filter-cake was washed with two 420 ml portions of water. The combined mother-liquor and first cake-wash contained 88% and the second cake-wash a further 5% of the input $P_2O_5$. XRD analysis of the dried residue showed the presence of quartz, fluoroapatite, calcium fluoride and calcium sulphate hemihydrate.

A portion of the combined mother-liquor and first cake-wash was distilled at 63° C. for 1 hour. The precipitated solid had an analysis of 48.5% $P_2O_5$, 1.3% $SO_3$ and contained 98% of the $P_2O_5$ of the starting liquor. XRD analysis showed the product to be monetite.

A further portion of the combined mother-liquor and first cake-wash was distilled at 83° C. for 15 minutes. A small amount of solid precipitated which had an analysis of 19.5% F and 21.4% $P_2O_5$. After filtering off the solid, the filtrate was further distilled at 78° C. for 60 minutes. A second quantity of solid precipitated with an analysis of 0.4% F, 49.2% $P_2O_5$ and 1.8% $SO_3$. 88% of the $P_2O_5$ input was recovered in the second precipitate.

EXAMPLE 5

A 1015 g sample of deslimed Duchess ore of the same composition as in Example 3 was leached for 4 hours at room temperature with a mixture of 790 g acetone, 3000 g water and 685 g sulphur dioxide. After flocculation, filtration and cake washing, the residue was oven dried at 100° C. 500 g of dry residue was obtained. The composition of the ore and residue is given in Table 1. 93% of the ore was extracted.

TABLE 1

| COMPONENT | ORE % | RESIDUE % |
|---|---|---|
| $P_2O_5$ | 22.5 | 3.2 |
| CaO | 30.0 | 8.8 |
| $Fe_2O_3$ | 1.1 | 2.5 |
| $Al_2O_3$ | 0.9 | 1.9 |
| $SiO_2$ | 37.7 | 76.2 |
| F | 2.4 | 3.3 |

EXAMPLE 6

A 860 g sample of deslimed Duchess ore of the same composition as in Example 3 was leached for 4 hours at 25° C. with a mixture of 790 g acetone, 2000 g water and 585 g sulphur dioxide. 88% of the $P_2O_5$ in the ore was extracted.

A portion of the combined mother-liquor and first cake-wash was distilled at 70° C. for 3 hours. The solid precipitate contained 93% of the input $P_2O_5$ and had an analysis of 47.2% $P_2O_5$, 42.9% CaO and 1.4% $SO_3$. XRD analysis showed it to be monetite.

After filtering off the first precipitate, the filtrate was further distilled at 98° C. for 30 minutes. A second quantity of solid precipitated which had an analysis of 13.9% $P_2O_5$, 44.9% CaO and 38.5$SO_3$. XRD analysis showed this to be a mixture of calcium sulphite hemihydrate and monetite.

EXAMPLE 7

A 50 g sample of shipping grade ore from Duchess containing 48.2% CaO, 34.1% $P_2O_5$ and 16.5% $SiO_2$ was leached with a mixture of 186 g water, 74.4 g of acetone and 53.4 g sulphur dioxide at 25° C. for 3 hours. During leaching, samples of solids were taken at regular intervals for examination by optical microscopy, and these did not show the presence of calcium α-hydroxysulphonate. At the end of leaching, the residue was separated from the liquor by flocculation and filtration. The residue was washed with a mixture of acetone, water and sulphur dioxide, followed by acetone. The washed solids were dried at 100° C. and analysed by XRD techniques. Neither calcium α-hydroxysulphonate nor calcium sulphite hemihydrate (the decomposition product of the sulphonate on heating) was detected in the residue. Analysis of the liquor showed 91.4% $P_2O_5$ extraction.

The method of formation of the leaching mixture is not critical and the mixture can be constituted in situ during the leaching process or by any other suitable method. The following example shows one such method.

EXAMPLE 8

A 500 g sample of Duchess phosphate ore (−10 mesh) containing 22.7% g $P_2O_5$ was leached for 15 minutes at 35° C. with a mixture of 40 g sulphur dioxide and 860 g water. A mixture of 430 g acetone, 50 g water and 300 g of sulphur dioxide was then added over 45 minutes and leaching continued for a further 2 hours at 35° C. Leach liquor analysis showed that 75% of the input $P_2O_5$ was extracted.

We claim:

1. In a process for the recovery of dicalcium phosphate from a phosphate ore, wherein the ore is leached with a mixture comprising water, sulphur dioxide and an organic carbonyl compound selected from the group comprising acetone, methyl ethyl ketone or methyl isobutyl ketone, cyclohexanone, acetaldehyde, formaldehyde and benzaldehyde; the leach liquor contains dissolved phosphate and calcium hydroxysulphonate and is separated from any gangue and other insoluble material; the improvement which comprises carrying out the leaching at a temperature in the range of from 10° to 40° C. and selecting the sulphur dioxide and carbonyl compound concentration such that substantially no calcium hydroxysulphonate is precipitated at the leaching stage; and treating the leach liquor to recover therefrom a dicalcium phosphate product and at least part of the sulphur dioxide and the carbonyl compound.

2. A process as claimed in claim 1, wherein the leaching mixture is saturated with sulphur dioxide.

3. The process of claim 1 wherein the leach liquor after separation is distilled in the range 80°–100° C. to produce a mixture of dicalcium phosphate and calcium sulphite, and to recover at least part of the sulphur dioxide and the carbonyl compound; and where the distillation is performed below about 90° C., the liquor remaining after recovery of the precipitated dicalcium phosphate and calcium sulphite, is distilled at 90°–100° C. for recovery of the carbonyl compound and sulphur dioxide.

4. A process as claimed in claim 1, wherein after separation, the leach liquor is treated with sulphuric acid during or after the leaching step to bring about the precipitation, as gypsum, of calcium in excess of that required to meet the Ca/P ratio of dicalcium phosphate, the gypsum is separated and the liquor is distilled at 80°–100° C. to precipitate dicalcium phosphate.

5. The process of claim 1, wherein after separation, the leach liquor is treated to precipitate dicalcium phosphate.

6. A process as claimed in claim 5, wherein, after separation the leach liquor is distilled at 55°–75° C. to precipitate mainly dicalcium phosphate.

7. A process as claimed in claim 5, wherein after separation, the leach liquor is distilled under reduced pressure at ambient temperature to precipitate mainly hydrated dicalcium phosphate.

8. A process as claimed in claim 5, wherein after separation, the leach liquor is held under reduced pressure to remove at least part of the sulphur dioxide, followed by distillation at 55°–75° C. to precipitate dicalcium phosphate.

9. A process as claimed in claim 5, wherein after separation, the leach liquor is distilled first at about 60° C. to precipitate a calcium fluoride-rich product, which is then separated, and then at about 75° C. to precipitate dicalcium phosphate.

10. A process as claimed in claim 6, wherein the liquor remaining after recovery of the precipitated dicalcium phosphate is distilled at 90°–100° C. for recovery of the carbonyl compound and sulphur dioxide, and to precipitate calcium sulphite.

* * * * *